United States Patent
Huang et al.

(10) Patent No.: US 7,330,522 B2
(45) Date of Patent: Feb. 12, 2008

(54) COMPLEMENTARY CODE KEYING (CCK) SEQUENTIALLY DECODING APPARATUS AND PROCESS THEREOF

(75) Inventors: Chen-Yen Huang, Hsin-Chu (TW); Kuang-Ping Ma, Hsin-Chu (TW); Chun-Chang Lin, Hsin-Chu (TW); Albert Chen, Hsin-Chu (TW)

(73) Assignee: Integrated System Solution Corp., Hsin-Chu (TW)

( * ) Notice: Subject to any disclaimer, the term of this patent is extended or adjusted under 35 U.S.C. 154(b) by 708 days.

(21) Appl. No.: 10/819,319

(22) Filed: Apr. 7, 2004

(65) Prior Publication Data

US 2005/0226351 A1 Oct. 13, 2005

(51) Int. Cl.
*H04L 27/00* (2006.01)
*H04B 1/00* (2006.01)
*G06F 17/15* (2006.01)
*G06F 17/10* (2006.01)

(52) U.S. Cl. ............ 375/343; 375/316; 375/142; 375/150; 708/422; 708/314

(58) Field of Classification Search ........ 375/240.23, 375/130, 343, 350, 316, 142, 135, 136, 150, 375/140, 147; 708/425, 314, 319, 422, 200, 708/100, 410, 400; 370/209, 203, 208
See application file for complete search history.

(56) References Cited

U.S. PATENT DOCUMENTS

| | | | |
|---|---|---|---|
| 6,674,818 B1* | 1/2004 | King et al. | 375/343 |
| 7,010,559 B2* | 3/2006 | Rawlins et al. | 708/425 |
| 7,233,969 B2* | 6/2007 | Rawlins et al. | 708/422 |
| 2002/0122466 A1 | 9/2002 | Somayazulu | |
| 2004/0071104 A1* | 4/2004 | Boesel et al. | 370/320 |
| 2004/0086062 A1* | 5/2004 | Eckhardt et al. | 375/343 |
| 2004/0230628 A1* | 11/2004 | Rawlins et al. | 708/422 |
| 2005/0185741 A1* | 8/2005 | Rawlins et al. | 375/343 |
| 2006/0115024 A1* | 6/2006 | Wu | 375/343 |

* cited by examiner

*Primary Examiner*—David C. Payne
*Assistant Examiner*—Linda Wong
(74) *Attorney, Agent, or Firm*—Birch, Stewart, Kolasch & Birch, LLP

(57) ABSTRACT

An apparatus of sequentially decoding CCK codes includes a series of received signal registers used to respectively temporarily save the received signals, a phase selector used to select one numeral from 1, −1, j or −j respectively for CCK code of each chip to multiple with the signal register, a series of adders used to sequentially complete adding operation, a series of sequential operation registers used to save values obtained from the sequential selecting operation of the phase selectors and the sequential adding operation of the adders, and a comparing device used to select a maximal value from those saved in the operation registers. The comparing device includes a comparator and a maximum register. According to the invention, the data processing speeds up while the hardware complexity is reduced.

13 Claims, 10 Drawing Sheets

COMPLEMENTARY CODE KEYING (CCK) SEQUENTIALLY DECODING APPARATUS AND PROCESS THEREOF

BACKGROUND OF THE INVENTION

1. Field of Invention

The present invention relates to a complementary code keying (CCK) sequentially decoding apparatus and a process of sequentially decoding CCK codes.

2. Related Art 802.11b greatly contributes to increase in two speeds of 5.5 Mbps and 11 Mbps in PHY of 802.11 protocol. In order to realize this object, a direct sequence spread spectrum (DSSS) is used as the only PHY transmission standard through which the 802.11b system can be compatible with the 802.11bps DSSS system of 1 Mbps and 2M.

At the beginning, the DSSS system of 802.11b uses a 11-digit chipping-barker sequence for data encoding and transmitting. Each 11-digital chipping represents a 1-bit digit signal: 1 or 0. This sequence is transformed into a symbol and then transmitted in the air at 1 Mbps (1M symbols per second) by a binary phase shifting keying (BPSK) mechanism. The mechanism of 2 Mbps transmission is more complex than the above and is called a 'quadrature phase shifting keying (QPSK)'. The data transmission rate of the QPSK is twice that of a BPSK and thus the bandwidth for the wireless transmission is increased.

In 802.11b standard, an advanced encoding technology is based on the complementary code keying instead of the 11-digit Baker sequence. Its core encoding includes 64 8-digit codes that can be correctly discriminated due to its special characteristics, even after interference or suffering multi-acceptation problems caused by reflection. 5.5 Mbps uses CCK series to transport the 4-bit digital data, and 11 Mbps uses CCK series to load 8-bit digital data.

FIG. 1 is a block diagram of the operation of a CCK tuner. An 8-bit series data is input and then divided into 8 groups by a series/parallel transformer 10. $D_0$~$D_5$ are used to select CCK codes by a CCK code selector 20. That is, one orthogonal complement is selected from 64 ones according to a certain rule, to obtain an 8-chip CCK code. Therefore, 6-bit data is tuned on the 8-chip CCK code. The CCK code includes a real part and an abstract part, that respectively correspond to I and Q paths to input to a differential circuit 30. In the differential circuit 30, $D_6$~$D_7$ rotate the CCK codes with one phase selected from 0°, 90°, 180°, 270°. Since the signals of I and Q paths rotate together, those signals still are orthogonal, reducing the influence of channel distortion.

One of the CCK characteristics is the sum of vectors except where the sum of shift index is zero. This characteristic highly increases the channel discrimination under the interference of multiple paths.

The CCK code sequence consists of 8 digits on a complex plane. This combination of CCK and QPSK is capable of encoding the 8 bits of each symbol so that 802.11b standard can transmit a signal with a data rate of 11 Mbps. A symbol rate increases from 1 Msym/sec to 1.375 Msym/sec. Encoding 4 bits of each symbol by an 802.11b system reduces the data rate to 5.5 Mbps, if the RF condition is not good as the best one.

The implement of the 802.11b standard further includes keeping the basic 802.11 backward compatibility with 1 Mpbs and 2 Mbps. In addition to the fact that the data rate in this mechanism is 5.5 times DSSS, it is also important for companies to provide excellent discrimination in a multiplex environment.

At IEEE802.11b/g standard, CCK can be transmitted at two packet rates, 5.5M and 11M. At the packet rate of 5.5M, the initial data is transmitted with 4 bits as a unit by selecting one from 16 groups of CCK codes. At the packet rate of 11M, the initial signal is transmitted with 8 bits as a unit by selecting one from 256 groups of CCK codes. Each group of CCK codes includes 8 chips. A receiver must judge what the received CCK is and then decode the initial information. Usually, a correlation between the received signals and each group of CCK codes is calculated. The decoded initial data bits are respectively bits corresponding to maximal CCK correlation values.

FIG. 2 illustrates the operation of a CCK code decoder. Each correlation calculator is used to calculate the correlation between the received signals and the corresponding CCK codes. For example, the No. 45 correlation calculator performs the following operation:

$$r_0 {}^*C^*_{0\_45} + r_1 {}^*C^*_{1\_45} + \ldots + r_7 {}^*C^*_{7\_45}$$

wherein $r_0 \ldots r_7$ is the received signals, $C_{0\_45} \ldots C_{7\_45}$ is No. 45 CCK code, * means conjugate. Although this operation is simple and direct, it needs an enormous amount of calculators and maximum search engines, which is very costly to implement in integrated circuits. The characteristic of CCK codes allows reducing the wiring complexity of CCK code correlation calculators via different mechanisms.

FIG. 3 is a schematic view of a conventional Fast Walsh Transform (FWT) device. FIG. 4 is a schematic view of a FWT applied in a system of calculating the correlation between IEEE802.11b/g-standard 11M CCK codes.

FIG. 4 is a schematic view of a FWT applied in a system calculating the correlation between IEEE802.11b/g-standard 11M CCK codes.

$$C = \{\exp j(\Phi_1+\Phi_2+\Phi_3+\Phi_4),\ \exp j(\Phi_1+\Phi_3+\Phi_4),\ \exp j(\Phi_1+\Phi_2+\Phi_4),\ -\exp j(\Phi_1+\Phi_4),\ \exp j(\Phi_1+\Phi_2+\Phi_3),\ \exp j(\Phi_1+\Phi_3),\ -\exp j(\Phi_1+\Phi_2),\ \exp j(\Phi_1)\}$$

Wherein C is a code word, $\exp j(\Phi_1+\Phi_2+\Phi_3+\Phi_4)$, $\exp j(\Phi_1+\Phi_3+\Phi_4)$, $\exp j(_1+\Phi_2+\Phi_4)$, $-\exp j(\Phi_1+\Phi_4)$, $\exp j(\Phi_1+\Phi_2+\Phi_3)$, $\exp j(\Phi_1+\Phi_3)$, $-\exp j(\Phi_1+\Phi_2)$, $\exp j(\Phi_1)$ are respectively 8 chips. $\Phi_1, \Phi_2, \Phi_3, \Phi_4$ are decided according to the digits to be transmitted. Each of $\Phi_1, \Phi_2, \Phi_3, \Phi_4$ can be one of $_0, \pi/2, \pi, 3\pi/2$, therefore there are totally $4^4$=256 code words.

In FIG. 3, signals $X_0, X_1, X_2, X_3, X_4, X_5, X_6, X_7$ are input and processed by a first layer (4 adders), a second layer (8 adders) and a third layer (16 adders) of FWT device to obtain 16 possible correlation results for $X_0, X_1, X_2, X_3, X_4, X_5, X_6, X_7$.

In FIG. 4, 4 FWT devices are included; each has different $\Phi_2$ for output 64 correlation results for $X_0, X_1, X_2, -X_3, X_4, X_5, -X_6, X_7$. A plurality of comparators arranged in a triangular array (not shown) compares the results to find the maximal one.

However, hardware sharing should be taken into consideration for both real-time data processing and reduction in the hardware complexity. If the real-time data processing can be achieved without hardware sharing, the required hardware is bulky. On the other hand, if the hardware sharing is well done, the data processing still takes time while the hardware complexity is uncertainly reduced. Therefore, there are two points needed to consider for the implementation of the FWT. First, 16 correlation values are not calculated until an eighth received signal is received. If the hardware sharing is not done, more adders are needed for speeding up the calculating speed. If the hardware sharing is done, the amount of adders can be reduced but more multiplexers are needed. Second, the comparison operation is not executed until all the 16 correlation values are obtained. The amount and complexity of comparators, and the real-time data processing are determined by the hardware sharing. If no hardware is shared, then 15 2-to-1 comparators are required, increasing the complexity of the system. If the hardware is heavily shared and a 2-to-1 comparator is used to compare the 16 correlation values, then 16 clocks are needed (it is assumed that 2-to-1 comparison can be finished in a clock). In this way, the comparison starts when all the 16 correlation values are obtained, which means the total processing time exceeds 16 clocks. Meanwhile, the amount of multiplexer increases and thus the complexity of the system cannot be reduced. Therefore, there is a need of a fast and less complex mechanism for calculating the correlation values.

U.S. patent application Ser. No. 09/753,047, titled "Fast Transform System for An Extended Data Rate WLAN System", discloses a fast transform device which adds a set of Twiddle Factors respectively corresponding to $\Phi_2, \Phi_3, \Phi_4$ to modify existing rotation factors $(1, j, -1, -j)$ by means of multiplication operation and thus reduces the operation times. However, this system still relies on the layered operation mechanism of the conventional FWT device.

SUMMARY OF THE INVENTION

It is therefore an object of the invention to provide a basic sequential complementary code keying (CCK) decoder and a process of sequentially decoding CCK codes that provide fast transformation with reduced hardware complexity.

In order to achieve the above and other objectives, the process of sequentially decoding CCK codes can be applied to a CCK code correlation calculation in a wireless network. The process receives a first received signal saved in a first signal register ($X_0$), multiplies the signal with 1, -1, j or -j according to a first set of CCK codes of No. 0 chip ($C_{0\_1}$), this product is saved in a first operation register ($R_0$). A second input signal is received and saved in a second signal register($X_1$), and multiplies with 1, -1, j or -j according to a first set of CCK codes of a No. 1 chip ($C_{1\_1}$), this product and the value of the first operation register ($R_0$) adding up to be saved in a second operation register ($R_1$). A third input signal is received and saved in a third signal register ($X_2$), and multiplies with 1, -1, j or -j according to a first set of CCK codes of a No. 2 chip ($C_{2\_1}$), this product and the value of the second operation register ($R_1$) add up to be saved in a third operation register ($R_2$). A fourth input signal is received and saved in a fourth signal register ($X_3$), and multiplies with 1, -1, j or -j according to a first set of CCK codes of a No. 3 chip ($C_{3\_1}$), this product and the value of the third operation register ($R_2$) add up to be saved in a fourth operation register ($R_3$). A fifth input signal is received and saved in a fifth signal register ($X_4$), and multiplies with 1, -1, j or -j according to a first set of CCK codes of a No. 4 chip ($C_{4\_1}$), this product and the value of the fourth operation register ($R_3$) add up to be saved in a fifth operation register ($R_4$). A sixth input signal is received and saved in a sixth signal register ($X_5$), and multiplies with 1, -1, j or -j according to a first set of CCK codes of a No. 5 chip ($C_{5\_1}$), this product and the value of the fifth operation register ($R_4$) add up to be saved in a sixth operation register ($R_5$). A seventh input signal is received and saved in a seventh signal register ($X_6$), and multiplies with 1, -1, j or -j according to a first set of CCK codes of a No. 6 chip ($C_{6\_1}$), this product and the value of the sixth operation register ($R_5$), and then is saved in a seventh operation register ($R_6$). An eighth input signal is received and saved in an eighth signal register ($X_7$), and multiples with 1, -1, j or -j according to a first set of CCK codes of a No. 7 chip ($C_{7\_1}$), this product and the value of the seventh operation register ($R_6$) add up to be saved in an eighth operation register ($R_7$).

The invention further provides an apparatus of sequentially decoding CCK codes that is applied to calculate CCK correlation in wireless network. The apparatus includes a series of received signal registers($X_0, X_1, X_2, X_3, X_4, X_5, X_6, X_7$) used to respectively temporarily save the received signals. A phase selector is used to select one numeral from 1, -1, j or -j respectively for CCK code of each chip to multiply with the signal register. A series of adders ($Adder_1$, $Adder_2$, $Adder_3$, $Adder_4$, $Adder_5$, $Adder_6$ and $Adder_7$) is used to sequentially complete adding operation. A series of sequential operation registers ($R_0, R_1, R_2, R_3, R_4, R_5, R_6, R_7$) is used to save values obtained from the sequential selecting operation of the phase selectors and the sequential adding operation of the adders, and a comparing device is used to select a maximal value from those saved in the operation registers. The comparing device includes a comparator and a maximum register ($R_8$).

The invention further has a system of sequentially decoding CCK codes, which is applied to calculate a CCK code correlation in a wireless network. The system includes a series of received signal registers ($X_0, X_1, X_2, X_3, X_4, X_5, X_6, X_7$) to temporarily save received signals, a first sequentially decoding module for sequentially decoding CCK codes according to the received signals, a second sequentially decoding module used to sequentially decode CCK codes according to the received signals, a third sequentially decoding module used to sequentially decode CCK codes according to the received signals, a fourth sequentially decoding module used to sequentially decode CCK codes according to the received signals, a fifth sequentially decoding module used to sequentially decode CCK codes according to the received signals, a sixth sequentially decoding module used to sequentially decode CCK codes according to the received signals, a seventh sequentially decoding module used to sequentially decode CCK codes according to the received signals; and an eighth sequentially decoding module used to sequentially decode CCK codes according to the received signals. Each sequentially decoding module includes a phase selector, a series of adders, a series of sequential operation registers, and a comparing device. The phase selector selects one of 1, -1, j or -j according to the CCK code of each chip to multiply with the corresponding value of the register. The series of adders ($Adder_1$, $Adder_2$, $Adder_3$, $Adder_4$, $Adder_5$, $Adder_6$ and $Adder_7$) is used to complete the adding operation in sequence. The series of sequential operation registers ($R_0, R_1, R_2, R_3, R_4, R_5, R_6$, and $R_7$) is used to save values obtained from the sequential selecting operation of the phase selectors and the sequential adding operation of the adders. The comparing device is used to select a maximal value among those saved in the operation registers. The comparing device includes a comparator and a maximum register ($R_8$).

According to the invention, only 7 adders, 9 registers and one 2-to-1 comparator are needed, with a reduced amount of multiplexers. The amount of above components needed for decoding 64 sets of CCK codes in the prior art is eight times the present invention. Furthermore, compared to the prior FWT mechanism, only 15 clocks are needed for real-time data processing, which significantly speeds up the data processing with simplified hardware assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and thus is not limitative of the present invention, wherein:

FIGS. 5-1 and 5-2 are a flowcharts of a method sequentially decoding CCK codes according one embodiment of the invention.

DETAILED DESCRIPTION OF THE INVENTION

Figure 6:
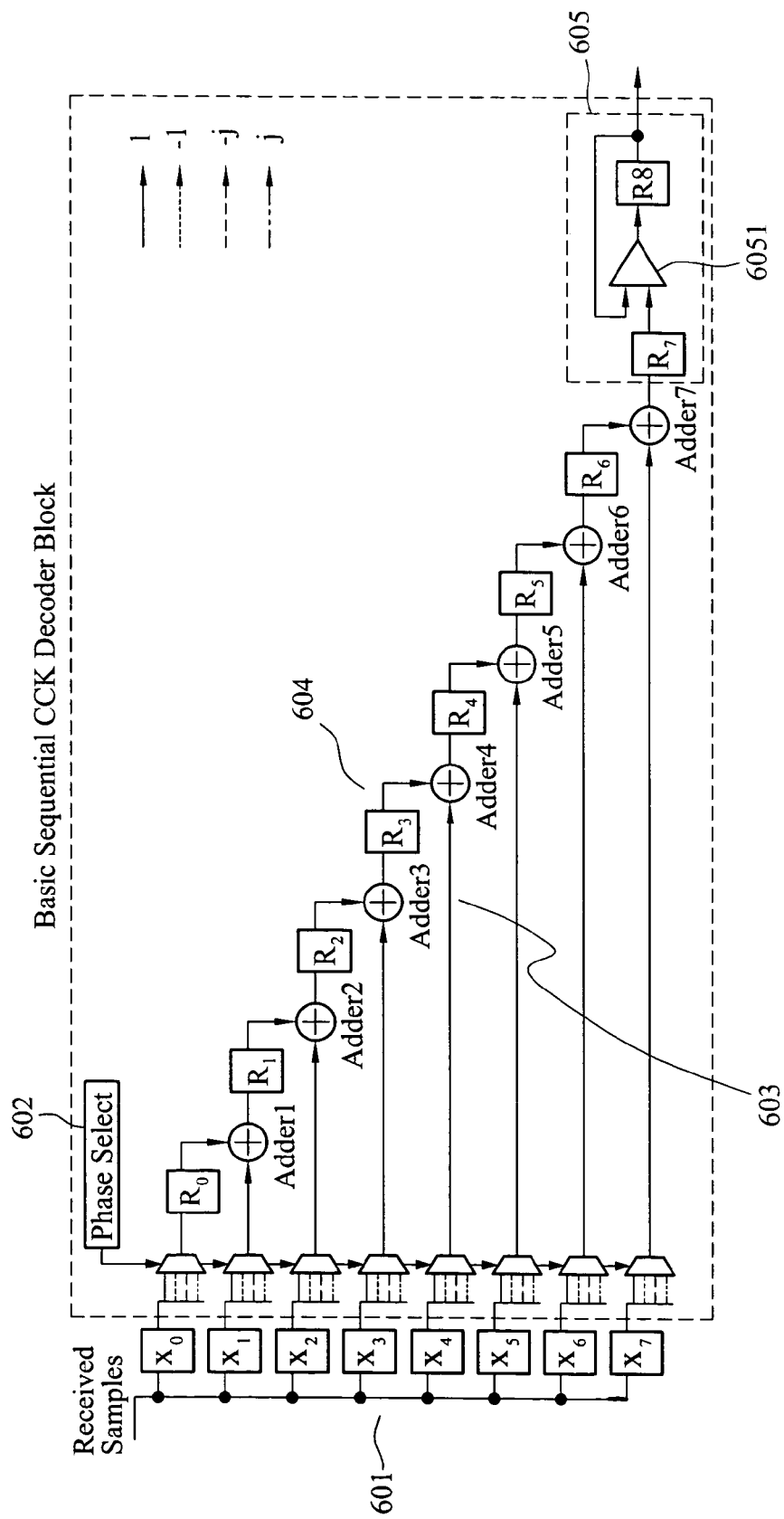
FIG. 6 is a schematic view of an apparatus sequentially decoding CCK codes according one embodiment of the invention.

FIG. 6 is a schematic view of an apparatus of sequentially decoding CCK codes according one embodiment of the invention. The apparatus of the invention is applied to calculate the CCK code correlation in a wireless network. The apparatus includes a series of received signal registers 601, a phase selector 602, a series of adders 603, a sequential operation register 604 and a comparing device 605.

The received signal registers 601 ($X_0$, $X_1$, $X_2$, $X_3$, $X_4$, $X_5$, $X_6$, $X_7$) are used to respectively temporarily save the received signals.

The phase selector 602 is used to select one numeral from 1, −1, j or −j respectively for CCK code of each chip to multiply with the signal register.

The series of adders 603 ($Adder_1$, $Adder_2$, $Adder_3$, $Adder_4$, $Adder_5$, $Adder_6$ and $Adder_7$) is used to sequentially complete the adding operation.

The series of sequential operation registers 604 ($R_0$, $R_1$, $R_2$, $R_3$, $R_4$, $R_5$, $R_6$, and $R_7$) is used to save values obtained from the sequential selecting operation of the phase selectors and the sequential adding operation of the adders, and a comparing device is used to select a maximal value from those saved in the operation registers.

The comparing device 605 includes a comparator 6051 and a maximum register ($R_8$).

The comparator 6051 can be a 2-to-1 comparator.

The received signal registers 601 include a first signal register $X_0$, a second signal register $X_1$, a third signal register $X_2$, a fourth signal register $X_3$, a fifth signal register $X_4$, a sixth signal register $X_5$, a seventh signal register $X_6$ and an eighth signal register $X_7$.

The sequential operation registers 604 include a first operation register $R_0$, a second operation register $R_1$, a third operation register $R_2$, a fourth operation register $R_3$, a fifth operation register $R_4$, a sixth operation register $R_5$, a seventh operation register $R_6$ and an eighth operation register $R_7$.

The adders 603 include a first adder $Adder_1$, a second $Adder_2$, a third adder $Adder_3$, a fourth $Adder_4$, a fifth $Adder_5$, a sixth $Adder_6$ and a seventh $Adder_7$.

$X_0$ is subjected to the phase selection and multiplication and then saved in $R_0$. $Adder_1$ adds up $R_0$ and the product of $X_1$ multiplies with a selected phase (1, −1, j, −j) and saves the obtained sum in $R_1$. $Adder_2$ adds up $R_1$ and the product of $X_2$ multiplies with a selected phase (1, −1, j, −j), and saves the obtained sum in $R_2$. $Adder_3$ adds up $R_2$ and the product of $X_3$ multiplies with a selected phase (1, −1, j, −j), and saves the obtained sum in $R_3$. $Adder_4$ adds up $R_3$ and the product of $X_4$ multiplies with a selected phase (1, −1, j, −j), and saves the obtained sum in $R_4$. $Adder_5$ adds up $R_4$ and the product of $X_5$ multiplies with a selected phase (1, −1, j, −j), and saves the obtained sum in $R_5$. $Adder_6$ adds up $R_5$ and the product of $X_6$ multiplies with a selected phase (1, −1, j, −j), and saves the obtained sum in $R_6$. $Adder_7$ adds up $R_6$ and the product of $X_7$ multiplies with a selected phase (1, −1, j, −j), and saves the obtained sum saved in $R_7$.

When a first received signal is received and saved in the first signal register ($X_0$), the phase selector selects one phase from 1, −1, j or −j according to a first set of CCK codes of a No. 0 chip ($C_{0\_1}$). This product is saved in the first operation register ($R_0$). When a second input signal is received and saved in a second signal register ($X_1$), the phase selector selects one phase from 1, −1, j or −j according to a first set of CCK codes of a No. 1 chip ($C_{1\_1}$). This product and the value of the first operation register ($R_0$) add up to be saved in the second operation register ($R_1$). Meanwhile, the phase selector selects a phase from 1, −1, j, −j according to a second set of CCK codes of a No. 0 chip ($C_{0\_2}$) to multiply with $X_0$. Similarly, when an eighth input signal is received and saved in the eighth signal register ($X_7$), the value generated by Adder7 and saved in R7 indicates the correlation between the corresponding received signal and the first CCK codes. At the next clock, the corresponding register stops inputting signals and starts repeating the above operations. The obtained values generated by Adder 7 and saved in R7 respectively indicate the correlation between the corresponding received signals and the second, third, fourth etc sets of CCK codes. Those obtained values are respectively compared with the currently saved maximal value in the maximum register ($R_8$) and replace the currently saved maximal value if the obtained value is bigger than the currently saved maximal value.

Figure 7:
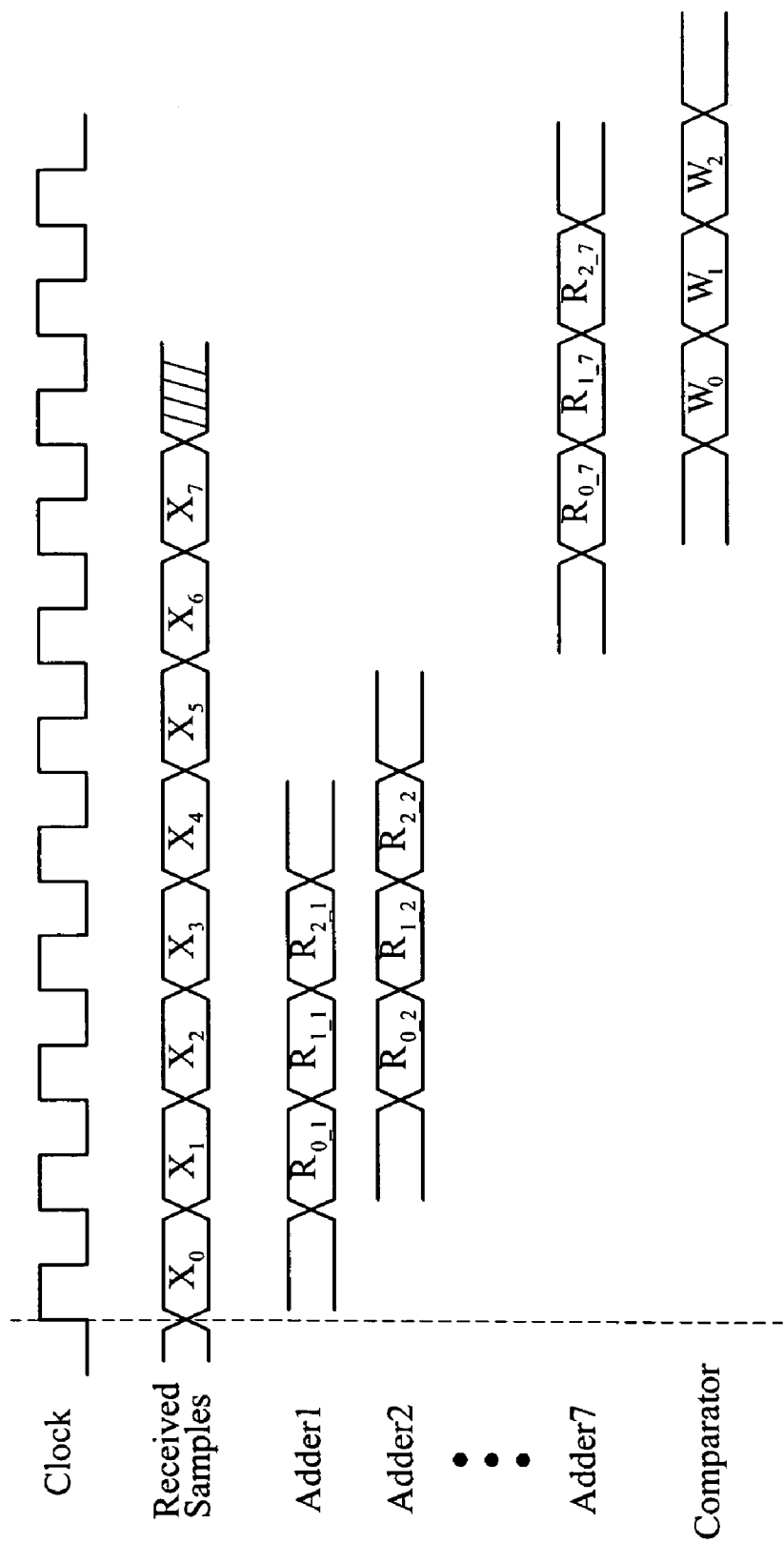
FIG. 7 is a CCK decoding apparatus according to one embodiment of the invention.
Figure 8:
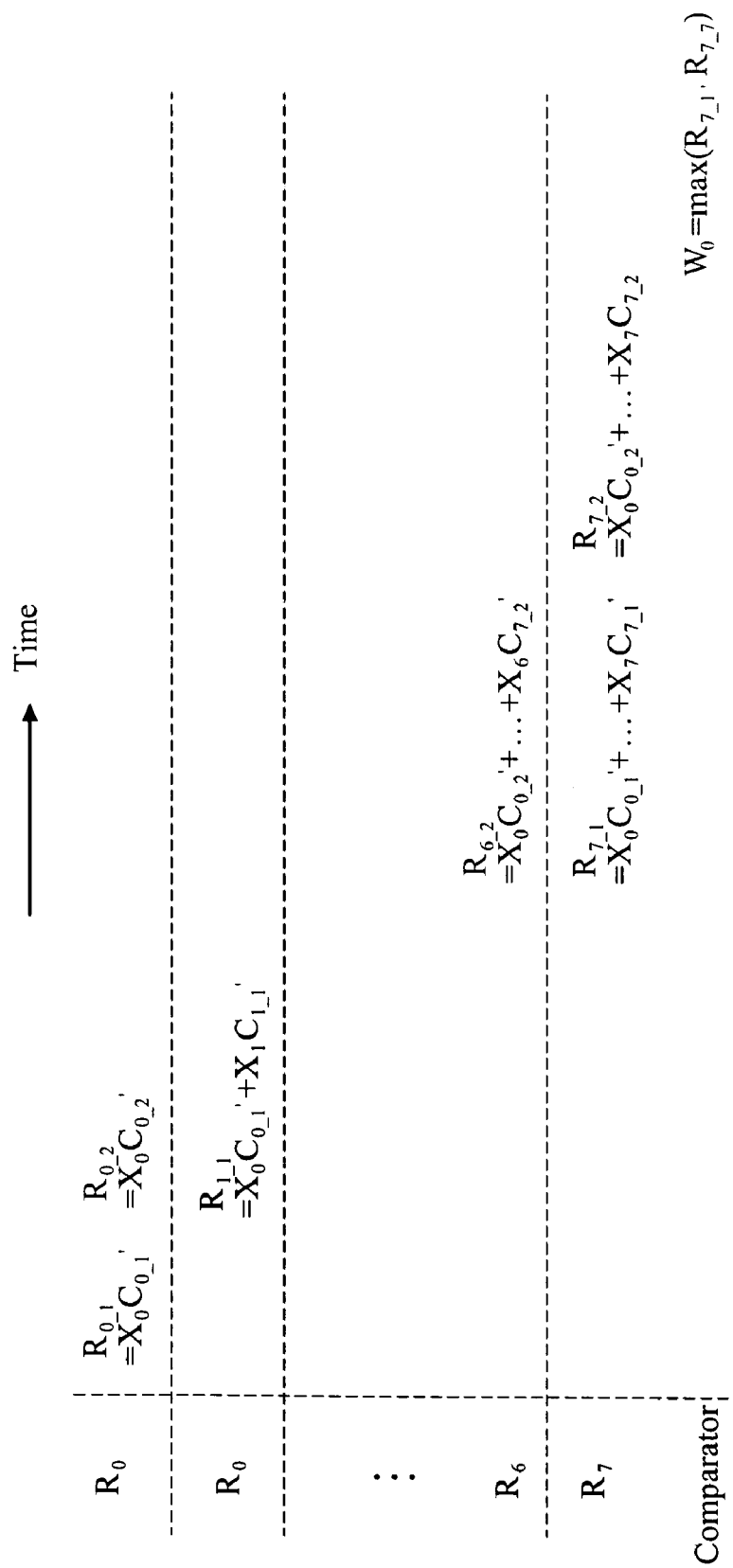
FIG. 8 is a flowchart of value operation according to one embodiment of the invention.

FIG. 7 illustrates a CCK decoding apparatus according to one embodiment of the invention. FIG. 8 is a flowchart of a value operation according to one embodiment of the invention.

In the first clock, the mean value of $R_0$ is $X_0 C^*_{0\_1}$.

In the second clock, the mean value of $R_1$ is $R_0 + X_1 C^*_{1\_1}$, i.e., $X_0 C^*_{0\_1} + X_1 C^*_{1\_1}$ and $R_0$ changes into $X_0 C^*_{0\_2}$.

In the third clock, the mean value of $R_2$ is $R_1 + X_2 C^*_{2\_1}$, i.e., $X_0 C^*_{0\_1} + X_1 C^*_{1\_1} + X_2 C^*_{2\_1}$. At this time, $R_1$ changes into $R_0 + X_1 C^*_{1\_2}$, i.e., $X_0 C^*_{0\_2} + X_1 C^*_{1\_2}$, and $R_0$ changes into $X_0 C^*_{0\_3}$.

In the fourth clock, the mean value of $R_3$ is $X_0C^*_{0\_1}+X_1C^*_{1\_1}+X_2C^*_{2\_1}+X_3C^*_{3\_1}$ and $R_2$ is $X_0C^*_{0\_2}+X_1C^*_{1\_2}+X_2C^*_{2\_2}$, $R_1$ is $X_0C^*_{0\_3}+X_1C^*_{1\_3}$ and $R_0$ is into $X_0C^*_{0\_4}$.

Similarly, at the seventh clock, $R_7$ indicates the correlation of the first set of CCK codes. At eighth clock, $R_7$ indicates the correlation of the second set of CCK codes. At fifteenth the clock, $R_7$ indicates the correlation of the eighth set of CCK codes.

Figure 1:
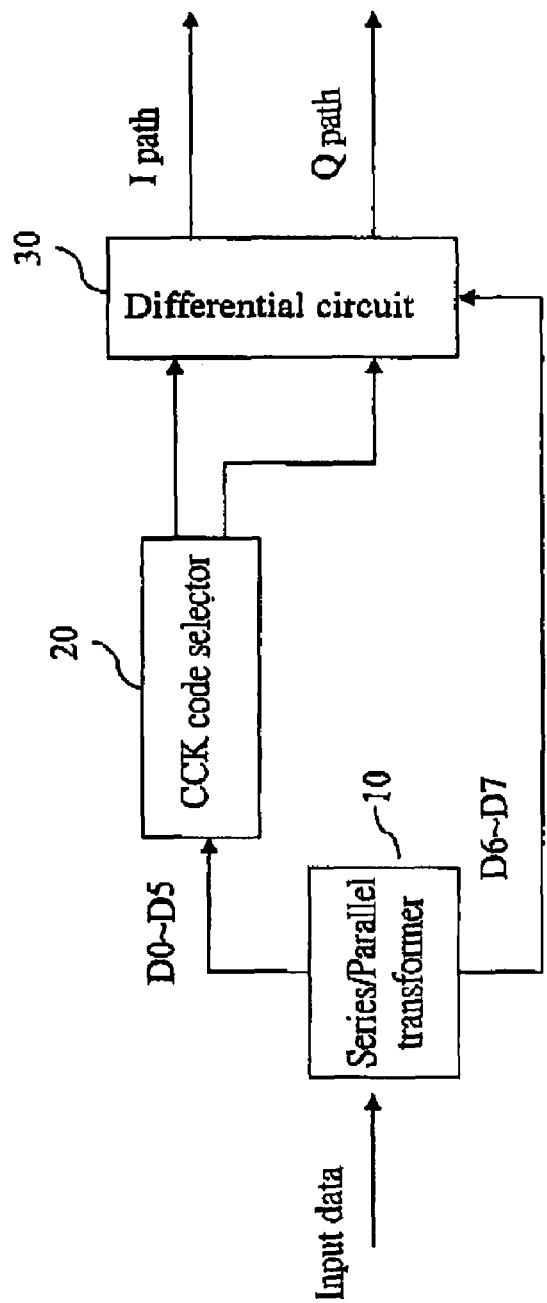
FIG. 1 is a block diagram of the operation of a CCK tuner.
Figure 2:
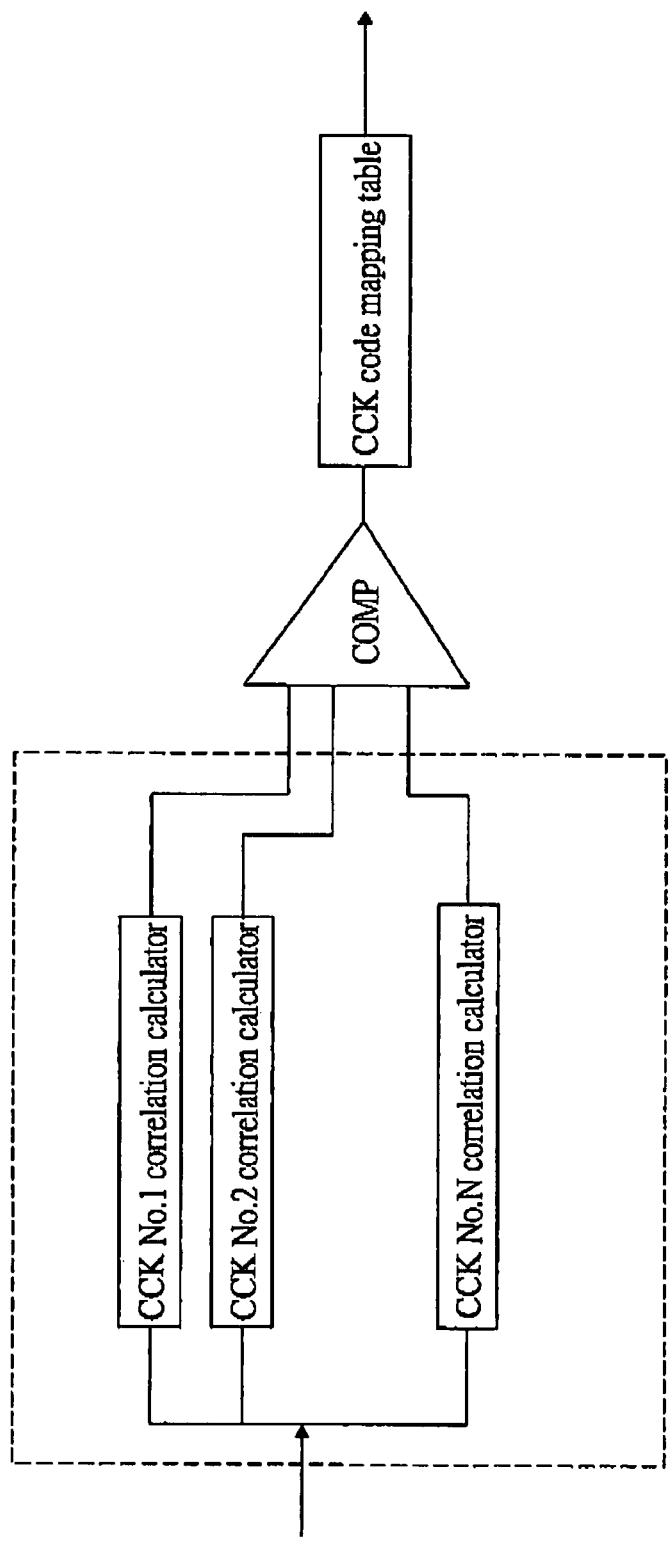
FIG. 2 is a schematic view of the operation of a CCK code decoder.
Figure 3:
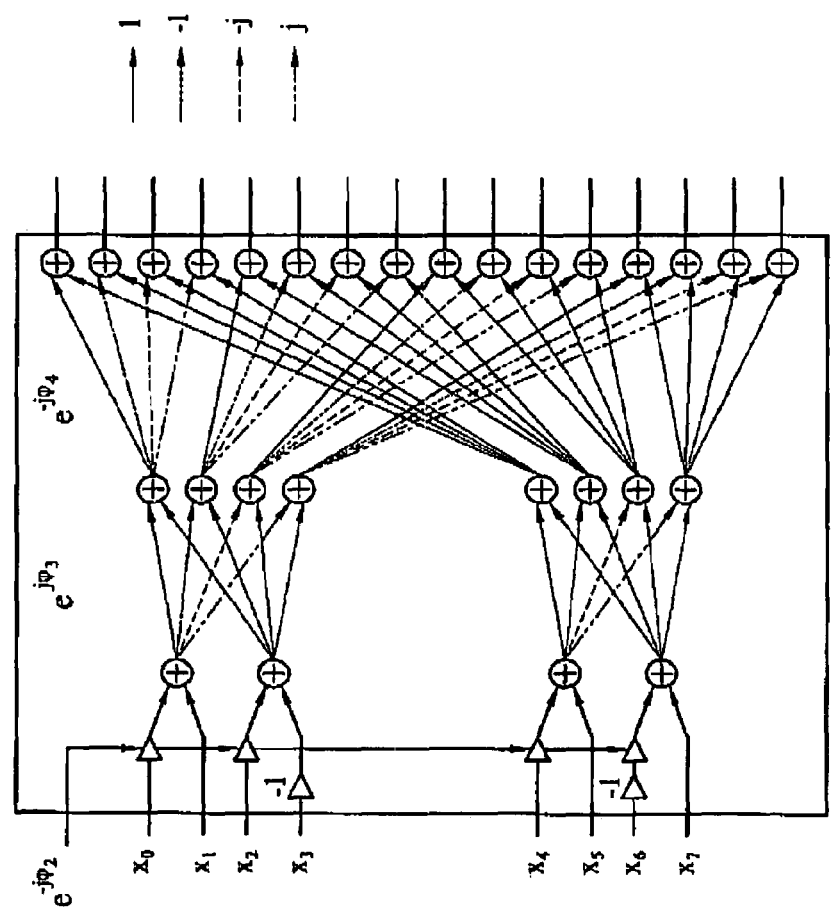
FIG. 3 is a schematic view of a conventional fast Walsh transformer (FWT).
Figure 4:
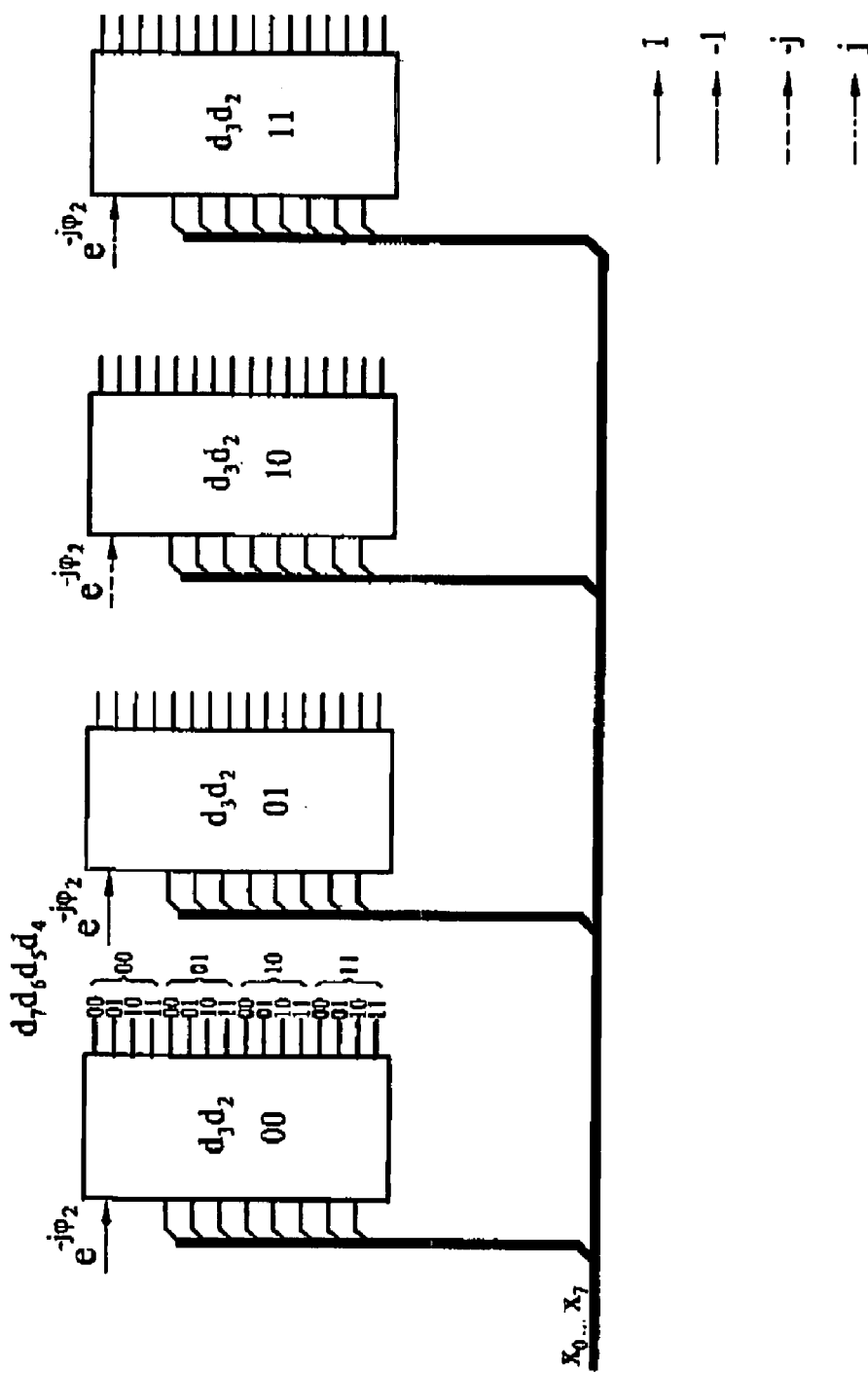
FIG. 4 is a schematic view of a FWT applied in a system calculating the correlation between IEEE802.11b/g-standard 11M CCK codes.
Figures 1, 5:
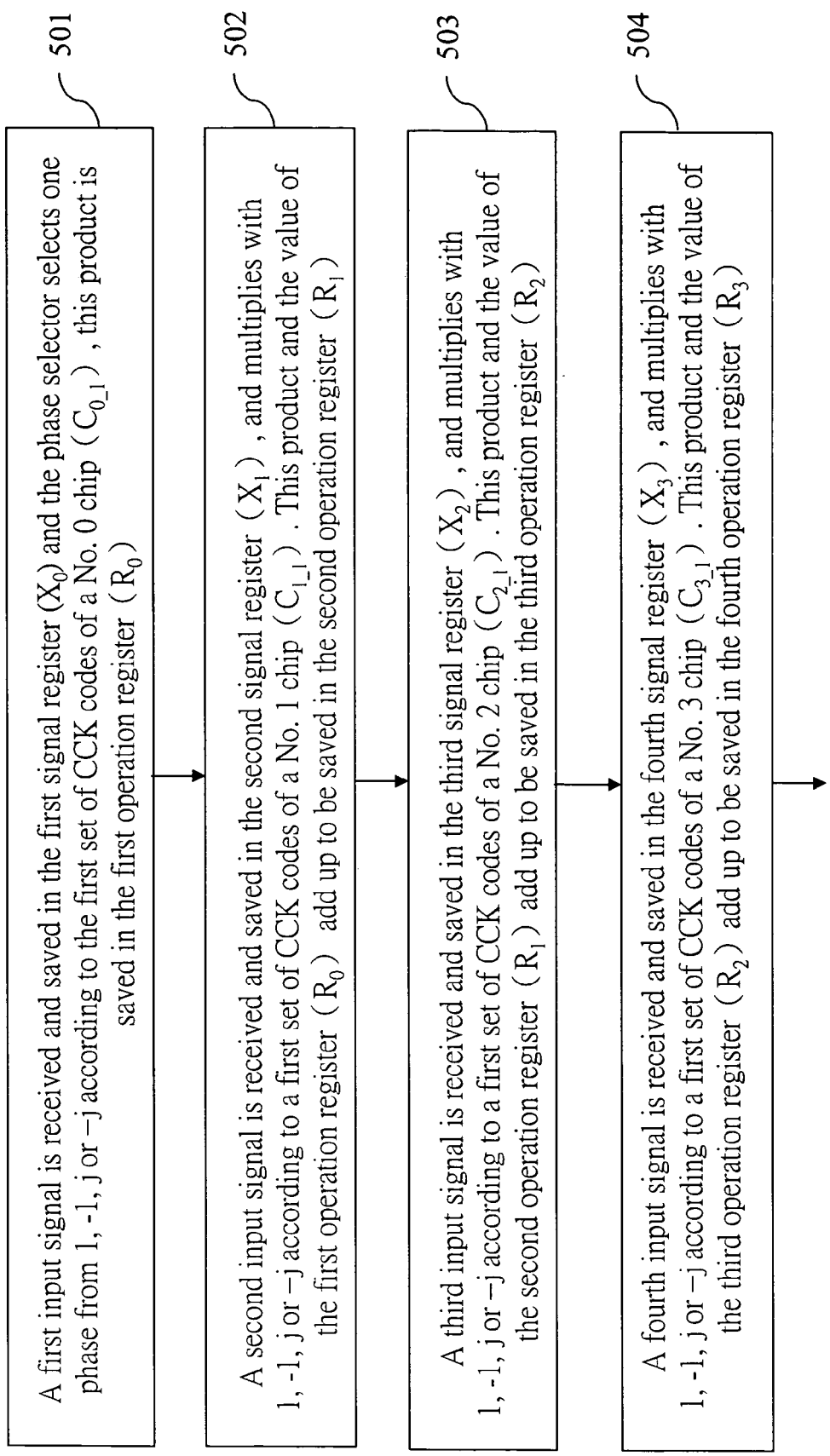
Figures 2, 5:
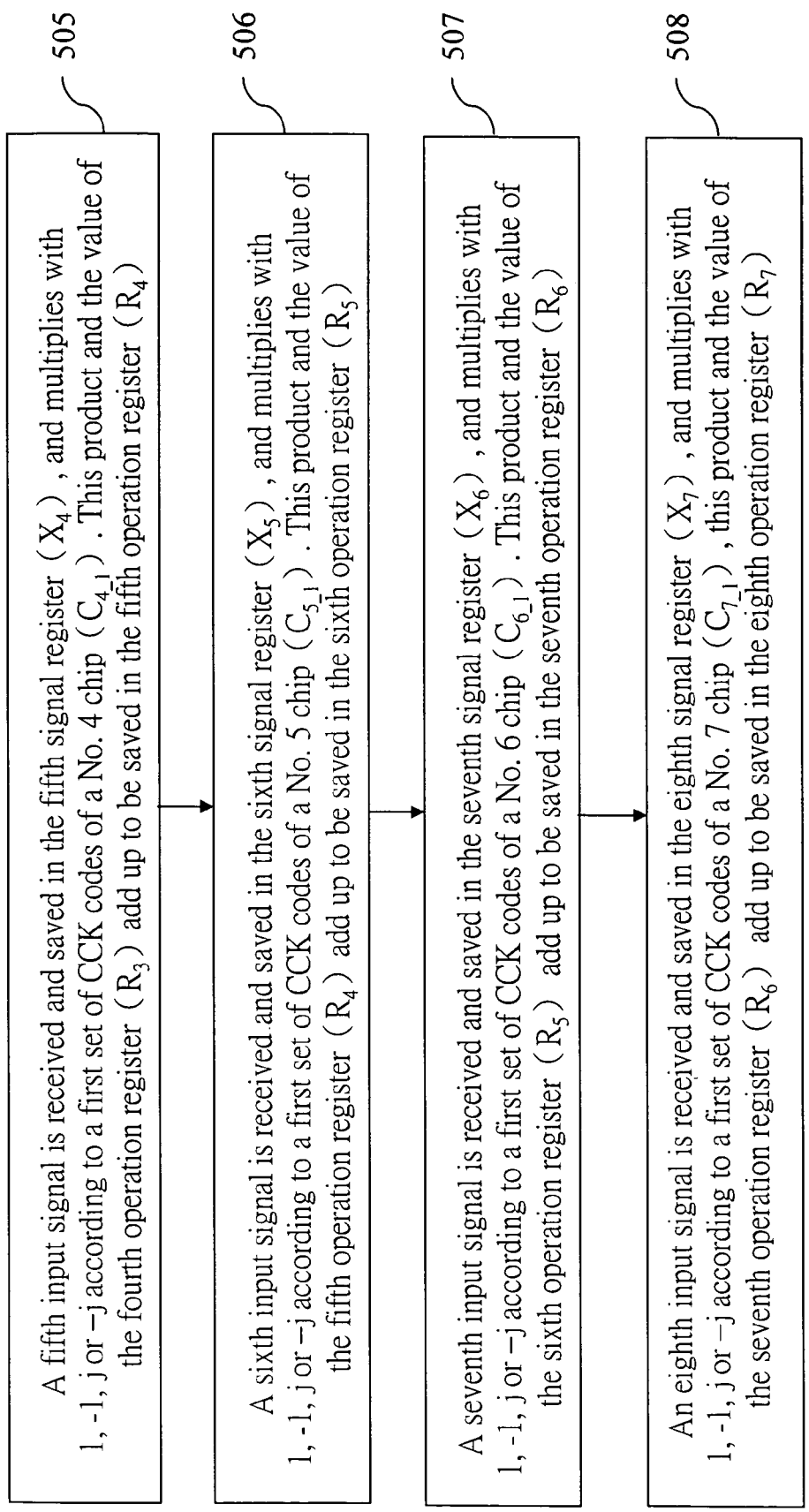

FIG. 5 illustrates a process of sequentially decoding CCK codes according to one embodiment of the invention. A first input signal is received and saved in the first signal register ($X_0$) and the phase selector selects one phase from 1, −1, j or −j according to the first set of CCK codes of a No. 0 chip ($C_{0\_1}$), this product is saved in the first operation register ($R_0$) (step 501). A second input signal is received and saved in the second signal register ($X_1$), and multiplies with 1, −1,j or −j according to a first set of CCK codes of a No. 1 chip ($C_{1\_1}$). This product and the value of the first operation register ($R_0$) add up to be saved in the second operation register ($R_1$) (step 502). A third input signal is received and saved in the third signal register ($X_2$), and multiplies with 1, −1, j or −j according to a first set of CCK codes of a No. 2 chip($C_{2\_1}$). This product and the value of the second operation register ($R_1$) add up to be saved in the third operation register($R_2$) (step 503). A fourth input signal is received and saved in the fourth signal register ($X_3$), and multiplies with 1, −1, j or −j according to a first set of CCK codes of a No. 3 chip ($C_{3\_1}$). This product and the value of the third operation register ($R_2$) add up to be saved in the fourth operation register ($R_3$) (step 504). A fifth input signal is received and saved in the fifth signal register($X_4$), and multiplies with 1, −1, j or −j according to a first set of CCK codes of a No. 4 chip ($C_{4\_1}$). This product and the value of the fourth operation register ($R_3$) add up to be saved in the fifth operation register ($R_4$) (step 505). A sixth input signal is received and saved in the sixth signal register ($X_5$), and multiplies with 1, −1, j or −j according to a first set of CCK codes of a No. 5 chip ($C_{5\_1}$). This product and the value of the fifth operation register ($R_4$) add up to be saved in the sixth operation register ($R_5$) (step 506). A seventh input signal is received and saved in the seventh signal register ($X_6$), and multiplies with 1, −1,j or −j according to a first set of CCK codes of a No. 6 chip ($C_{6\_1}$). This product and the value of the sixth operation register ($R_5$) add up to be saved in the seventh operation register ($R_6$) (step 507). An eighth input signal is received and saved in the eighth signal register($X_7$), and multiplies with 1, −1,j or −j according to a first set of CCK codes of a No. 7 chip ($C_{7\_1}$), this product and the value of the seventh operation register ($R_6$) add up to be saved in the eighth operation register ($R_7$) (step 508). $R_7$ indicates the correlation between the corresponding values and the first sets of CCK codes.

After the second signal is received (step 502), one of 1, −1, j, or −j is selected according to a second set of CCK codes of a No. 0 chip($C_{0\_2}$) to multiply with the first signal register ($X_0$), the product is saved in the first operation register ($R_0$).

After the third signal is received (step 503), one of 1, −1, j, or −j is selected according to a second set of CCK codes of a No. 1 chip ($C_{1\_2}$) to multiply with the value of the second signal register ($X_1$). The product and the first operation register ($R_0$) add up to be saved in the second operation register ($R_1$).

After the fourth signal is received (step 504), one of 1, −1,j, or −j is selected according to a second set of CCK codes of a No. 2 chip ($C_{2\_2}$) to multiple with the value of the third signal register ($X_2$). The product and the second operation register ($R_1$) add up to save in the third operation register ($R_2$).

After the fifth signal is received (step 505), one of 1, −1, j, or −j is selected according to a second set of CCK codes of No. 3 chip ($C_{3\_2}$) to multiply with the value of the fourth signal register ($X_3$). The product and the third operation register ($R_2$) add up to be saved in the fourth operation register ($R_3$).

After the sixth signal is received (step 506), one of 1, −1, j, or −j is selected according to a second set of CCK codes of a No. 4 chip ($C_{4\_2}$) to multiply with the value of the fifth signal register ($X_4$). The product and the fourth operation register ($R_3$) add up to be saved in the fifth operation register ($R_4$).

After the seventh signal is received (step 507), one of 1, −1, j, or −j is selected according to a second set of CCK codes of No. 5 chip ($C_{5\_2}$) to multiply with the value of the sixth signal register ($X_5$). The product and the fifth operation register ($R_4$) add up to be saved in the sixth operation register ($R_5$).

After the seventh signal is received (step 508)), one of 1, −1, j, or −j is selected according to a second set of CCK codes of No. 6 chip ($C_{6\_2}$) to multiply with the value of the seventh signal register ($X_6$). The product and the sixth operation register ($R_5$) add up to be saved in the seventh operation register ($R_6$).

One of 1, −1, j, or −j is selected according to a second set of CCK codes of a No. 7 chip ($C_{7\_2}$) to multiply with the value of the eighth signal register ($X_7$). The product and the sixth operation register ($R_6$) add up to be saved in the eighth operation register ($R_7$). At this time, the value saved in $R_7$ indicates the correlation between the received signals and the second sets of CCK codes.

Meanwhile, after the third signal is received (step 503), one of 1, −1, j, or −j is selected according to a third set of CCK codes of a No. 0 chip ($C_{0\_3}$) to multiply with the value of the first signal register ($X_0$). The product is saved in the first operation register ($R_0$).

After the fourth signal is received (step 504), one of 1, −1,j, or −j is selected according to a third set of CCK codes of a No. 1 chip($C_{1\_3}$) to multiply with the value of the second signal register ($X_1$). The product and the first operation register ($R_0$) add up to be saved in the second operation register ($R_1$).

After the fifth signal is received (step 505), one of 1, −1,j, or −j is selected according to a third set of CCK codes of a No. 2 chip ($C_{2\_3}$) to multiply with the value of the third signal register ($X_2$). The product and the second operation register ($R_1$) add up to be saved in the third operation register ($R_2$).

After the sixth signal is received (step 506), one of 1, −1, j, or −j is selected according to a third set of CCK codes of a No. 3 chip ($C_{3\_3}$) to multiply with the value of the fourth signal register ($X_3$). The product and the value of the third operation register ($R_2$) add up to be saved in the fourth operation register ($R_3$).

After the seventh signal is received (step 507), one of 1, −1, j, or −j is selected according to a third set of CCK codes of a No. 4 chip ($C_{4\_3}$) to multiply with the value of the fifth signal register ($X_4$). The product and the value of the fourth operation register ($R_3$) add up to be saved in the fifth operation register ($R_4$).

After the eighth signal is received (step 508)), one of 1, −1, j, or −j is selected according to a third set of CCK codes of a No. 5 chip ($C_{5\_3}$) to multiply with the value of the sixth signal register ($X_5$). The product and the value of the fifth operation register ($R_4$) add up to be saved in the sixth operation register ($R_5$).

One of 1, −1, j, or −j is selected according to a third set of CCK codes of a No. 6 chip ($C_{6\_3}$) to multiply with the value of the seventh signal register ($X_6$). The product and the value of the sixth operation register ($R_5$) add up to be saved in the seventh operation register ($R_6$).

One of 1, −1, j, or −j is selected according to a third set of CCK codes of a No. 7 chip ($C_{7\_3}$) to multiply with the eighth signal register ($X_7$). The product and the value of the seventh operation register ($R_6$) add up to be saved in the eighth operation register ($R_7$). At this time, the value saved in $R_7$ indicates the correlation between the received signals and the third sets of CCK codes.

Meanwhile, after the fourth signal is received (step 504), one of 1, −1, j, or −j is selected according to a fourth set of CCK codes of a No. 0 chip ($C_{0\_4}$) to multiply with the value of a first signal register ($X_0$). The product is saved in the first operation register ($R_0$).

After the fifth signal is received (step 505), one of 1, −1, j, or −j is selected according to a fourth set of CCK codes of a No. 1 chip ($C_{1\_4}$) to multiply with the second signal register ($X_1$). The product and the value of the first operation register ($R_0$) add up to be saved in the second operation register ($R_1$).

After the sixth signal is received (step 506), one of 1, −1, j, or −j is selected according to a fourth set of CCK codes of a No. 2 chip ($C_{2\_4}$) to multiply with the third signal register ($X_2$). The product and the second operation register ($R_1$) add up to be saved in the third operation register ($R_2$).

After the seventh signal is received (step 507), one of 1, −1, j, or −j is selected according to a fourth set of CCK codes of a No. 3 chip ($C_{3\_4}$) to multiply with the fourth signal register ($X_3$). The product and the third operation register ($R_2$) add up to be saved in the fourth operation register ($R_3$).

After the eighth signal is received (step 508), one of 1, −1, j, or −j is selected according to a fourth set of CCK codes of a No. 4 chip ($C_{4\_4}$) to multiply with the fifth signal register ($X_4$). The product and the fourth operation register ($R_3$) add up to be saved in the fifth operation register ($R_4$).

One of 1, −1, j, or −j is selected according to a fourth set of CCK codes of a No. 5 chip ($C_{5\_4}$) to multiply with the sixth signal register ($X_5$). The product and the fifth operation register ($R_4$) add up to be saved in the sixth operation register ($R_5$).

One of 1, −1, j, or −j is selected according to a fourth set of CCK codes of a No. 6 chip ($C_{6\_4}$) to multiply with the seventh signal register($X_6$). The product and the sixth operation register ($R_5$) add up to be saved in the seventh operation register ($R_6$).

One of 1, −1, j, or −j is selected according to a fourth set of CCK codes of a No. 7 chip ($C_{7\_4}$) to multiply with the eighth signal register ($X_7$). The product and the seventh operation register ($R_6$) add up to be saved in the eighth operation register ($R_7$). At this time, the value saved in $R_7$ indicates the correlation between the received signals and the fourth sets of CCK codes.

Meanwhile, after the fifth signal is received (step 505), one of 1, −1, j, or −j is selected according to a fifth set of CCK codes of a No. 0 chip ($C_{0\_5}$) to multiply with the first signal register ($X_0$). The product is saved in the first operation register ($R_0$).

After the sixth signal is received (step 506), one of 1, −1, j, or −j is selected according to a fifth set of CCK codes of a No. 1 chip ($C_{1\_5}$) to multiply with the second signal register ($X_1$). The product and the first operation register ($R_0$) add up to be saved in the second operation register ($R_1$).

After the seventh signal is received (step 507), one of 1, −1, j, or −j is selected according to a fifth set of CCK codes of a No. 2 chip ($C_{2\_5}$) to multiply with the third signal register ($X_2$). The product and the second operation register ($R_1$) add up to be saved in the third operation register ($R_2$).

After the eighth signal is received (step 508), one of 1, −1, j, or −j is selected according to a fifth set of CCK codes of a No. 3 chip ($C_{3\_5}$) to multiply with the fourth signal register ($X_3$). The product and the third operation register ($R_2$) add up to be saved in the fourth operation register ($R_3$).

One of 1, −1, j, or −j is selected according to a fifth set of CCK codes of a No. 4 chip ($C_{4\_5}$) to multiply with the fifth signal register ($X_4$). The product and the fourth operation register ($R_3$) add up to be saved in the fifth operation register ($R_4$).

One of 1, −1, j, or −j is selected according to a fifth set of CCK codes of a No. 5 chip ($C_{5\_5}$) to multiply with the sixth signal register ($X_5$). The product and the fifth operation register ($R_4$) add up to be saved in the sixth operation register ($R_5$).

One of 1, −1, j, or −j is selected according to a fifth set of CCK codes of a No. 6 chip ($C_{6\_5}$) to multiply with the seventh signal register($X_6$). The product and the sixth operation register ($R_5$) add up to be saved in the seventh operation register ($R_6$).

One of 1, −1, j, or −j is selected according to a fifth set of CCK codes of a No. 7 chip ($C_{7\_5}$) to multiply with the eighth signal register ($X_7$). The product and the seventh operation register ($R_6$) add up to be saved in the eighth operation register ($R_7$). At this time, the value saved in $R_7$ indicates the correlation between the received signals and the fifth sets of CCK codes.

Meanwhile, after the sixth signal is received (step 506), one of 1, −1, j, or −j is selected according to a sixth set of CCK codes of a No. 0 chip ($C_{0\_6}$) to multiply with the first signal register ($X_0$). The product is saved in the first operation register ($R_0$).

After the seventh signal is received (step 507), one of 1, −1, j, or −j is selected according to a sixth set of CCK codes of a No. 1 chip ($C_{1\_6}$) to multiply with the second signal register ($X_1$). The product and the first operation register ($R_0$) add up to be saved in the second operation register ($R_1$).

After the eighth signal is received (step 508), one of 1, −1, j, or −j is selected according to a sixth set of CCK codes of a No. 2 chip($C_{2\_6}$) to multiply with the third signal register($X_2$). The product and the second operation register ($R_1$) add up to be saved in the third operation register ($R_2$).

One of 1, −1, j, or −j is selected according to a sixth set of CCK codes of a No. 3 chip ($C_{3\_6}$) to multiply with the fourth signal register ($X_3$). The product and the third operation register ($R_2$) add up to be saved in the fourth operation register ($R_3$).

One of 1, −1, j, or −j is selected according to a sixth set of CCK codes of a No. 4 chip ($C_{4\_6}$) to multiply with the fifth signal register ($X_4$). The product and the fourth operation register ($R_3$) add up to be saved in the fifth operation register ($R_4$).

One of 1, −1, j, or −j is selected according to a sixth set of CCK codes of a No. 5 chip ($C_{5\_6}$) to multiply with the sixth signal register ($X_5$). The product and the fifth operation register ($R_4$) add up to be saved in the sixth operation register ($R_5$).

One of 1, −1, j, or −j is selected according to a sixth set of CCK codes of a No. 6 chip ($C_{6\_6}$) to multiply with the seventh signal register($X_6$). The product and the sixth operation register ($R_5$) add up to be saved in the seventh operation register ($R_6$).

One of 1, −1, j, or −j is selected according to a sixth set of CCK codes of a No. 7 chip ($C_{7\_6}$) to multiply with the eighth signal register ($X_7$). The product and the seventh operation register ($R_6$) add up to be saved in the eighth operation register ($R_7$). At this time, the value saved in $R_7$ indicates the correlation between the received signals and the sixth sets of CCK codes.

Meanwhile, after the seventh signal is received (step 507), one of 1, −1, j, or −j is selected according to a seventh set of CCK codes of a No. 0 chip ($C_{0\_7}$) to multiply with the first signal register ($X_0$). The product is saved in the first operation register ($R_0$).

After the eighth signal is received (step 508), one of 1, −1, j, or −j is selected according to a seventh set of CCK codes of a No. 1 chip ($C_{1\_7}$) to multiply with the second signal register ($X_1$). The product and the first operation register ($R_0$) add up to be saved in the second operation register ($R_1$).

One of 1, −1, j, or −j is selected according to a seventh set of CCK codes of a No. 2 chip ($C_{2\_7}$) to multiply with the third signal register ($X_2$). The product and the second operation register ($R_1$) add up to be saved in the third operation register ($R_2$).

One of 1, −1, j, or −j is selected according to a seventh set of CCK codes of a No. 3 chip ($C_{3\_7}$) to multiply with the fourth signal register ($X_3$). The product and the third operation register ($R_2$) add up to be saved in the fourth operation register ($R_3$).

One of 1, −1, j, or −j is selected according to a seventh set of CCK codes of a No. 4 chip ($C_{4\_7}$) to multiply with the fifth signal register ($X_4$). The product and the fourth operation register ($R_3$) add up to be saved in the fifth operation register ($R_4$).

One of 1, −1, j, or −j is selected according to a seventh set of CCK codes of a No. 5 chip ($C_{5\_7}$) to multiply with the sixth signal register ($X_5$). The product and the fifth operation register ($R_4$) add up to be saved in the sixth operation register ($R_5$).

One of 1, −1, j, or −j is selected according to a seventh set of CCK codes of a No. 6 chip ($C_{6\_7}$) to multiply with the seventh signal register($X_6$). The product and the sixth operation register ($R_5$) add up to be saved in the seventh operation register ($R_6$).

One of 1, −1, j, or −j is selected according to a seventh set of CCK codes of a No. 7 chip ($C_{7\_7}$) to multiply with the eighth signal register ($X_7$). The product and the seventh operation register ($R_6$) add up to be saved in the eighth operation register ($R_7$). At this time, the value saved in $R_7$ indicates the correlation between the received signals and the seventh sets of CCK codes.

Meanwhile, after the eighth signal is received (step 508), one of 1, −1, j, or −j is selected according to an eighth seventh set of CCK codes of a No. 0 chip ($C_{0\_8}$) to multiply with the first signal register ($X_0$). The product is saved in the first operation register ($R_0$).

One of 1, −1, j, or −j is selected according to an eighth set of CCK codes of a No. 1 chip ($C_{1\_8}$) to multiply with the second signal register ($X_1$). The product and the first operation register ($R_0$) add up to be saved in the second operation register ($R_1$).

One of 1, −1, j, or −j is selected according to an eighth set of CCK codes of a No. 2 chip ($C_{2\_8}$) to multiply with the third signal register ($X_2$). The product and the second operation register ($R_1$) add up to be saved in the third operation register ($R_2$).

One of 1, −1, j, or −j is selected according to an eighth set of CCK codes of a No. 3 chip ($C_{3\_8}$) to multiply with the fourth signal register ($X_3$). The product and the third operation register ($R_2$) add up to be saved in the fourth operation register ($R_3$).

One of 1, −1, j, or −j is selected according to an eighth set of CCK codes of a No. 4 chip ($C_{4\_8}$) to multiply with the fifth signal register ($X_4$). The product and the fourth operation register ($R_3$) add up to be saved in the fifth operation register ($R_4$).

One of 1, −1, j, or −j is selected according to an eighth set of CCK codes of a No. 5 chip ($C_{5\_8}$) to multiply with the sixth signal register ($X_5$). The product and the fifth operation register ($R_4$) add up to be saved in the sixth operation register ($R_5$).

One of 1, −1, j, or −j is selected according to an eighth set of CCK codes of a No. 6 chip ($C_{6\_8}$)to multiply with the seventh signal register($X_6$). The product and the sixth operation register ($R_5$) add up to be saved in the seventh operation register ($R_6$).

One of 1, −1, j, or −j is selected according to an eighth set of CCK codes of a No. 7 chip ($C_{7\_8}$) to multiply with the eighth signal register ($X_7$). The product and the seventh operation register ($R_6$) add up to be saved in the eighth operation register ($R_7$). At this time, the value saved in $R_7$ indicates the correlation between the received signals and the eighth sets of CCK codes.

The maximal one is chosen among the values respectively indicating the received signals and the corresponding sets of CCK codes and then saved in the maximum register ($R_8$).

For example, before a first correlation value is obtained at step 508, there is no value saved in the maximum register $R_8$. Therefore, the first correlation value is the maximal one and should be saved in the maximum register $R_8$. A second correlation value is obtained at the next clock $R_7$. Then the second correlation value is compared with the currently maximal value saved in $R_8$, and the bigger one is saved in $R_8$. Repeat this operation until the comparison for all the correlation values have done.

Figure 9:
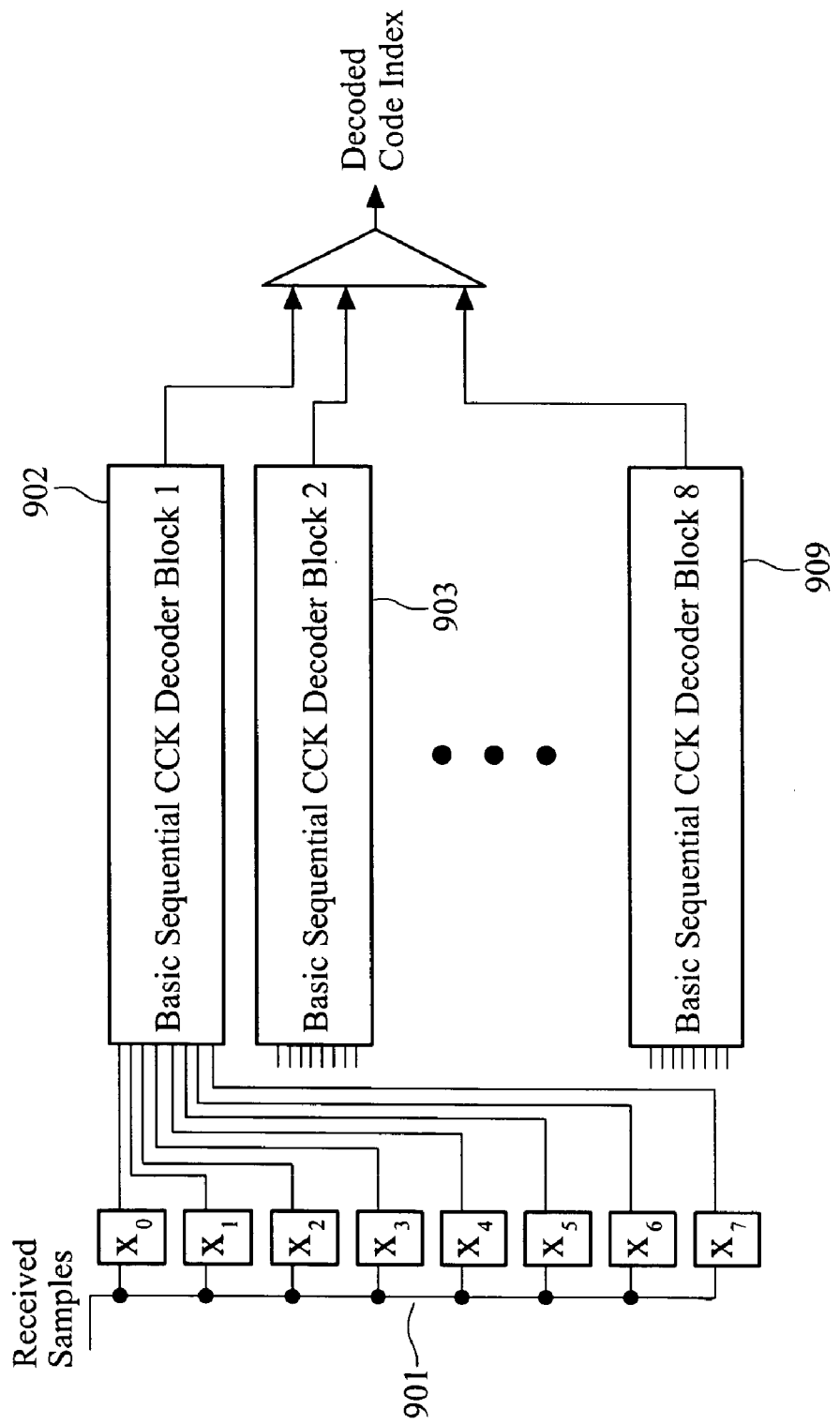
FIG. 9 is a schematic view of a 64-set basic sequential decoding system according to one embodiment of the invention.

FIG. 9 is a schematic view of a 64-set basic sequential decoding system applied in the correlation calculation of CCK codes in wireless network to decode IEEE802.11b/g-standard 11M CCK codes according to one embodiment of the invention. It is noted that the system of the invention can be also applied in decoding IEEE802.11b/g-standard 5.5M CCK codes to reduce the hardware complexity. The system includes a series of received signal registers 901, and a first to eighth basic sequential decoding modules 902, 903, 904 . . . 909.

The series of received signal registers 901 ($X_0$, $X_1$, $X_2$, $X_3$, $X_4$, $X_5$, $X_6$, $X_7$) are used to respectively temporarily save the received signals.

The first to eighth basic sequentially decoding modules 902, 903 . . . 909 are used to sequentially decode CCK codes according to the received signals.

Each basic sequentially decoding module includes:
  a phase selector, used to select one phase from 1, −1, j, −j for each chip to sequentially multiply with the series of registers;
  a series of adders ($Adder_1$, $Adder_2$, $Adder_3$, $Adder_4$, $Adder_5$, $Adder_6$ and $Adder_7$) used to sequentially complete the addition operation;
  a series of sequential operation registers ($R_0$, $R_1$, $R_2$, $R_3$, $R_4$, $R_5$, $R_6$, $R_7$) used to save values obtained from the sequential selecting operation of the phase selectors and the sequential adding operation of the adders; and a comparing device used to select a maximal value from those saved in the operation registers. The comparing device includes a comparator and a maximum register ($R_8$). The comparator can be a 2-to-1 comparator.

The received signal registers include a first signal register $X_0$, a second signal register $X_1$, a third signal register $X_2$, a fourth signal register $X_3$, a fifth signal register $X_4$, a sixth signal register $X_5$, a seventh signal register $X_6$ and a eighth signal register $X_7$.

The sequential operation registers include a first operation register $R_0$, a second operation register $R_1$, a third operation register $R_2$, a fourth operation register $R_3$, a fifth operation register $R_4$, a sixth operation register $R_5$, a seventh operation register $R_6$ and a eighth operation register $R_7$.

The adders include a first adder $Adder_1$, a second $Adder_2$, a third adder $Adder_3$, a fourth $Adder_4$, a fifth $Adder_5$, a sixth $Adder_6$ and a seventh $Adder_7$.

$X_0$ is subjected to the phase selection and multiplication and then the result is saved in $R_0$. $Adder_1$ adds up $R_0$ and the product of $X_1$ multiplies with a selected phase $(1, -1, j, -j)$ and saves the obtained sum in $R_1$. $Adder_2$ adds up $R_1$ and the product of $X_2$ multiplies with a selected phase $(1, -1, j, -j)$, and saves the obtained sum in $R_2$. $Adder_3$ adds up $R_2$ and the product of $X_3$ multiplies with a selected phase $(1, -1, j, -j)$, and saves the obtained sum in $R_3$. $Adder_4$ adds up $R_3$ and the product of $X_4$ multiplies with a selected phase $(1, -1, j, -j)$, and saves the obtained sum in $R_4$. $Adder_5$ adds up $R_4$ and the product of $X_5$ multiplies with a selected phase $(1, -1, j, -j)$, and saves the obtained sum in $R_5$. $Adder_6$ adds up $R_5$ and the product of $X_6$ multiplies with a selected phase $(1, -1, j, -j)$, and saves the obtained sum in $R_6$. $Adder_7$ adds up $R_6$ and the product of $X_7$ multiplies with a selected phase $(1, -1, j, -j)$, and saves the obtained sum saved in $R_7$.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process of sequentially decoding complementary code keying (CCK) codes, applicable in CCK code correlation in a wireless network, the process comprising:

receiving and saving a first input signal in a first signal register (Xo) and then the first signal multiplying with one selected from $1, -1, j$ or $-j$ according to the first set of CCK codes of No. 0 chip ($C_{0\_1}$), this product being saved in the first operation register ($R_0$);

receiving and saving a second input signal in a second signal register (X1) and then the second signal multiplying with one selected from $1, -1, j$ or $-j$ according to a first set of CCK codes of No. 1 chip ($C_{1\_1}$), this product and the value of the first operation register ($R_0$) adding up to save in a second operation register ($R_1$);

receiving and saving a third input signal in a third signal register (X2), and then the third signal multiplying with $1, -1, j$ or $j$ according to a first set of CCK codes of No. 2 chip ($C_{2\_1}$), this product and the value of the second operation register (R1) adding up to save in a third operation register ($R_2$);

receiving and saving a fourth input signal in a fourth signal register (X3), and then the fourth signal multiplying with $1, -1, j$ or $-j$ according to a first set of CCK codes of No. 3 chip ($C_{3\_1}$), this product and the value of the third operation register ($R_2$) adding up to save in a fourth operation register ($R_3$);

receiving and saving a fifth input signal in a fifth signal register ($X_4$), and then the fifth input signal multiplying with $1, -1, j$ or $-j$ according to a first set of CCK codes of No. 4 chip ($C_{4\_1}$), this product and the value of the fourth operation register ($R_3$) adding up to save in a fifth operation register ($R_4$)

receiving and saving a sixth input signal in a sixth signal register ($X_5$), and then the sixth input signal multiplying with $1, -1, j$ or $j$ according to a first set of CCK codes of No. 5 chip ($C_{5\_1}$), this product and the value of the fifth operation register ($R_4$) adding up to save in a sixth operation register ($R_5$);

receiving and saving a seventh input signal in a seventh signal register ($X_6$), and then the seventh input signal multiplying with $1, -1, j$ or $-j$ according to a first set of CCK codes of No. 6 chip ($C_{6\_1}$), this product and the value of the sixth operation register ($R_5$) adding up to save in a seventh operation register ($R_6$); and receiving and saving an eighth input signal in an eighth signal register($X_7$), and then the eighth input signal multiplying with $1, -1, j$ or $-j$ according to a first set of CCK codes of No. 7 chip($C_{7\_1}$), this product and the value saved in the seventh operation register($R_6$) adding up to save in an eighth operation register ($R_7$).

2. The process of claim 1, further comprising:

after the second signal has been received, selecting one of $1, -1, j,$ or $-j$ according to a second set of CCK codes of No. 0 chip ($C_{0\_2}$) to multiple with the first signal register ($X_0$), the product being saved in the first operation register ($R_0$);

after the third signal has been received, selecting one of $1, -1, j,$ or $-j$ according to a second set of CCK codes of No. 1 chip ($C_{1\_2}$) to multiple with the value of the second signal register($X_1$), the product and the first operation register($R_0$) adding up to save in the second operation register ($R_1$);

after the fourth signal has been received, selecting one of $1, -1, j,$ or $-j$ according to a second set of CCK codes of No. 2 chip ($C_{2\_2}$) to multiple with the value of the third signal register ($X_2$), the product and the second operation register ($R_1$) adding up to save in the third operation register ($R_2$);

after the fifth signal has been received, selecting one of $1, -1, j,$ or $-j$ according to a second set of CCK codes of No. 3 chip ($C_{3\_2}$) to multiple with the value of the fourth signal register($X_3$), the product and the third operation register($R_2$) adding up to save in the fourth operation register ($R_3$);

after the sixth signal has been received, selecting one of $1, -1, j,$ or $-j$ according to a second set of CCK codes of No. 4 chip ($C_{4\_2}$) to multiple with the value of the fifth signal register ($X_4$), the product and the fourth operation register ($R_3$) adding up to save in the fifth operation register ($R_4$);

after the seventh signal has been received, selecting one of $1, -1, j,$ or $-j$ according to a second set of CCK codes of No. 5 chip ($C_{5\_2}$) to multiple with the value of the sixth signal register ($X_5$), the product and the fifth operation register ($R_4$) adding up to save in the sixth operation register ($R_5$);

after the eighth signal has received, selecting one of $1, -1, j,$ or $-j$ according to a second set of CCK codes of No. 6 chip ($C_{6\_2}$) to multiple with the value of the seventh signal register ($X_6$), the product and the sixth operation register ($R_5$) adding up to save in the seventh operation register ($R_6$); and selecting one of 1, −1, j, or −j is selected according to a second set of CCK codes of No. 7 chip ($C_{7\_2}$) to multiple with the value of the eighth signal register ($X_7$), the product and the sixth operation register ($R_6$) adding up to save in the eighth operation register ($R_7$).

3. The process of claim 1, further comprising:

after the third signal has been received, selecting one of 1, −1, j, or −j according to a third set of CCK codes of No. 0 chip ($C_{0\_3}$) to multiple with the value of the first signal register ($X_0$), the product being saved in the first operation register ($R_0$);

after the fourth signal has been received, selecting one of 1, −1, j, or −j according to a third set of CCK codes of No. 1 chip ($C_{1\_3}$) to multiple with the value of the second signal register($X_1$), the product and the first operation register($R_0$) adding up to save in the second operation register ($R_1$);

after the fifth signal has been received, selecting one of 1, −1, j, or −j according to a third set of CCK codes of No. 2 chip ($C_{2\_3}$) to multiple with the value of the third signal register ($X_2$), the product and the second operation register ($R_1$) adding up to save in the third operation register ($R_2$);

after the sixth signal has been received, selecting one of 1, −1, j, or −j according to a third set of CCK codes of No. 3 chip ($C_{3\_3}$) to multiple with the value of the fourth signal register ($X_3$), the product and the value of third operation register ($R_2$) adding up to save in the fourth operation register ($R_3$);

after the seventh signal has been received, selecting one of 1, −1, j, or −j according to a third set of CCK codes of No. 4 chip ($C_{4\_3}$) to multiple with the value of the fifth signal register ($X_4$), the product and the value of the fourth operation register ($R_3$) adding up to save in the fifth operation register ($R_4$);

after the eighth signal has been received, selecting one of 1, −1, j, or −j according to a third set of CCK codes of No. 5 chip ($C_{5\_3}$) to multiple with the value of the sixth signal register ($X_5$), the product and the value of the fifth operation register ($R_4$) adding up to save in the sixth operation register ($R_5$);

selecting one of 1, −1, j, or −j according to a third set of CCK codes of No. 6 chip ($C_{6\_3}$) to multiple with the value of the seventh signal register ($X_6$), the product and the value of the sixth operation register ($R_5$) adding up to save in the seventh operation register ($R_6$); and selecting one of 1, −1, j, or −j according to a third set of CCK codes of No. 7 chip ($C_{7\_3}$) to multiple with the eighth signal register ($X_7$), the product and the value of the seventh operation register ($R_6$) adding up to save in the eighth operation register ($R_7$).

4. The process of claim 1, further comprising:

after the fourth signal has been received, selecting one of 1, −1, j, or −j according to a fourth set of CCK codes of No. 0 chip ($C_{0\_4}$) to multiple with the value of first signal register ($X_0$), the product being saved in the first operation register ($R_0$);

after the fifth signal has been received, selecting one of 1, −1, j, or −j according to a fourth set of CCK codes of No. 1 chip($C_{1\_4}$) to multiple with the second signal register($X_1$), the product and the value of first operation register ($R_0$) adding up to save in the second operation register ($R_1$);

after the sixth signal has been received, selecting one of 1, −1, j, or −j according to a fourth set of CCK codes of No. 2 chip ($C_{2\_4}$) to multiple with the third signal register ($X_2$), the product and the second operation register ($R_1$) adding up to save in the third operation register ($R_2$);

after the seventh signal has been received, selecting one of 1, −1, j, or −j according to a fourth set of CCK codes of No. 3 chip ($C_{3\_4}$) to multiple with the fourth signal register ($X_3$), the product and the third operation register ($R_2$) adding up to save in the fourth operation register ($R_3$);

after the eighth signal has been received, selecting one of 1, −1, j, or −j according to a fourth set of CCK codes of No. 4 chip ($C_{4\_4}$) to multiple with the fifth signal register ($X_4$), the product and the fourth operation register ($R_3$) adding up to save in the fifth operation register ($R_4$);

selecting one of 1, −1, j, or −j according to a fourth set of CCK codes of No. 5 chip ($C_{5\_4}$) to multiple with the sixth signal register ($X_5$), the product and the fifth operation register ($R_4$) adding up to save in the sixth operation register ($R_5$);

selecting one of 1, −1, j, or −j according to a fourth set of CCK codes of No. 6 chip($C_{6\_4}$) to multiple with the seventh signal register ($X_6$), the product and the sixth operation register ($R_5$) adding up to save in the seventh operation register ($R_6$); and selecting one of 1, −1, j, or −j according to a fourth set of CCK codes of No. 7 chip ($C_{7\_4}$) to multiple with the eighth signal register ($X_7$), the product adding up the seventh operation register ($R_6$) and the obtained sum is saved in the eighth operation register ($R_7$).

5. The process of claim 1, further comprising:

after the fifth signal has been received, selecting one of 1, −1, j, or −j according to a fifth set of CCK codes of No. 0 chip ($C_{0\_5}$) to multiple with the first signal register ($X_0$), the product being is saved in the first operation register ($R_0$);

after the sixth signal has been received, selecting one of 1, −1, j, or −j according to a fifth set of CCK codes of No. 1 chip ($C_{1\_5}$) to multiple with the second signal register ($X_1$), the product and the first operation register ($R_0$) adding up to save in the second operation register ($R_1$);

after the seventh signal has been received, selecting one of 1, −1, j, or −j according to a fifth set of CCK codes of No. 2 chip ($C_{2\_5}$) to multiple with the third signal register ($X_2$), the product and the second operation register ($R_1$) adding up to save in the third operation register ($R_2$);

after the eighth signal has been received, selecting one of 1, −1, j, or −j according to a fifth set of CCK codes of No. 3 chip ($C_{3\_5}$) to multiple with the fourth signal register ($X_3$), the product and the third operation register ($R_2$) adding up to save in the fourth operation register ($R_3$);

selecting one of 1, −1, j, −j according to a fifth set of CCK codes of No. 4 chip ($C_{4\_5}$) to multiple with the fifth signal register ($X_4$), the product and the fourth operation register ($R_3$) adding up to save in the fifth operation register ($R_4$), selecting one of 1, −1, j, or −j according to a fifth set of CCK codes of No. 5 chip ($C_{5\_5}$) to multiple with the sixth signal register ($X_5$), the product and the fifth operation register ($R_4$) adding up to save in the sixth operation register ($R_5$);

selecting one of 1, −1, j, or −j according to a fifth set of CCK codes of No. 6 chip ($C_{6\_5}$) to multiple with the seventh signal register ($X_6$), the product and the sixth operation register ($R_5$) adding up to save in the seventh operation register ($R_6$);

selecting one of 1, −1, j, or −j according to a fifth set of CCK codes of No. 7 chip ($C_{7\_5}$) to multiple with the eighth signal register ($X_7$), the product and the seventh operation register ($R_6$) adding up to save in the eighth operation register ($R_7$).

6. The process of claim 1, further comprising:

after the sixth signal has been received, selecting one of 1, −1, j, or −j according to a sixth set of CCK codes of No. 0 chip ($C_{0\_6}$) to multiple with the first signal register ($X_0$), the product being saved in the first operation register ($R_0$);

after the seventh signal has been received, selecting one of 1, −1, j, or −j according to a sixth set of CCK codes of No. 1 chip ($C_{1\_6}$) to multiple with the second signal register ($X_1$), the product and the first operation register ($R_0$) adding up to save in the second operation register ($R_1$);

after the eighth signal has been received, selecting one of 1, −1, j, or −j according to a sixth set of CCK codes of No. 2 chip ($C_{2\_6}$) to multiple with the third signal register ($X_2$), the product and the second operation register ($R_1$) adding up to save in the third operation register ($R_2$);

selecting one of 1, −1, j, or −j according to a sixth set of CCK codes of No. 3 chip ($C_{3\_6}$) to multiple with the fourth signal register ($X_3$), the product and the third operation register ($R_2$) adding up to save in the fourth operation register ($R_3$);

selecting one of 1, −1, j, or −j according to a sixth set of CCK codes of No. 4 chip ($C_{4\_6}$) to multiple with the fifth signal register ($X_4$), the product and the fourth operation register ($R_3$) adding up to save in the fifth operation register ($R_4$);

selecting one of 1, −1, j, or −j according to a sixth set of CCK codes of No. 5 chip ($C_{6\_6}$) to multiple with the sixth signal register ($X_5$), the product and the fifth operation register ($R_4$) adding up to save in the sixth operation register ($R_5$);

selecting one of 1, −1, j, or −j according to a sixth set of CCK codes of No. 6 chip ($C_{6\_6}$) to multiple with the seventh signal register ($X_6$), the product and the sixth operation register ($R_5$) adding up to save in the seventh operation register ($R_6$); and selecting one of 1, −1, j, or −j is selected according to a sixth set of CCK codes of No. 7 chip ($C_{2\_6}$) to multiple with the eighth signal register ($X_7$), the product and the seventh operation register ($R_6$) adding up to save in the eighth operation register ($R_7$).

7. The process of claim 1, further comprising:

after the seventh signal has been received, selecting one of 1, −1, j, or −j according to a seventh set of CCK codes of No. 0 chip ($C_{0\_7}$) to multiple with the first signal register ($X_0$), the product being saved in the first operation register ($R_0$);

after the eighth signal has been received, selecting one of 1, −1, j, or −j according to a seventh set of CCK codes of No. 1 chip ($C_{1\_7}$) to multiple with the second signal register ($X_1$), the product and the first operation register ($R_0$) adding up to save in the second operation register ($R_1$);

selecting one of 1, −1, j, or −j according to a seventh set of CCK codes of No. 2 chip ($C_{2\_7}$) to multiple with the third signal register ($X_2$), the product and the second operation register ($R_1$) adding up to save in the third operation register ($R_2$)

selecting one of 1, −1, j, or −j according to a seventh set of CCK codes of No. 3 chip ($C_{3\_7}$) to multiple with the fourth signal register ($X_3$), the product and the third operation register ($R_2$) adding up to save in the fourth operation register ($R_3$);

selecting one of 1, −1, j, or −j according to a seventh set of CCK codes of No. 4 chip ($C_{4\_7}$) to multiple with the fifth signal register ($X_4$), the product and the fourth operation register ($R_3$) adding up to save in the fifth operation register ($R_4$);

selecting one of 1, −1, j, or −j according to a seventh set of CCK codes of No. S chip ($C_{5\_7}$) to multiple with the sixth signal register ($X_5$), the product and the fifth operation register ($R_4$) adding up to save in the sixth operation register ($R_5$);

selecting one of 1, −1, j, or −j is selected according to a seventh set of CCK codes of No. 6 chip ($C_{6\_7}$) to multiple with the seventh signal register ($X_6$), the product and the sixth operation register ($R_5$) adding up to save in the seventh operation register ($R_6$);

selecting one of 1, −1, j, or −j according to a seventh set of CCK codes of No. 7 chip ($C_{7\_7}$) to multiple with the eighth signal register ($X_7$), the product and the seventh operation register ($R_6$) adding up to save in the eighth operation register ($R_7$).

8. The process of claim 1, further comprising:

after the eighth signal has been received, one of 1, −1, j, or −j is selected according to an eighth seventh set of CCK codes of No. 0 chip (Cog) to multiple with the first signal register ($X_3$), the product being saved in the first operation register ($R_0$);

selecting one of 1, −1, j, or −j according to an eighth set of CCK codes of No. 1 chip ($C_{1\_8}$) to multiple with the second signal register ($X_1$), the product and the first operation register ($R_0$) adding up to save in the second operation register ($R_1$);

selecting one of 1, −1, j, or −j according to an eighth set of CCK codes of No. 2 chip ($C_{2\_3}$) to multiple with the third signal register ($X_2$), the product and the second operation register ($R_1$) adding up to save in the third operation register ($R_2$)

selecting one of 1, −1, j, or −j according to an eighth set of CCK codes of No. 3 chip ($C_{3\_8}$) to multiple with the fourth signal register ($X_3$), the product and the third operation register ($R_2$) adding up to save in the fourth operation register ($R_3$);

selecting one of 1, −1, j, or −j according to an eighth set of CCK codes of No. 4 chip ($C_{4\_8}$) to multiple with the fifth signal register ($X_4$), the product and the fourth operation register ($R_3$) adding up to save in the fifth operation register ($R_4$);

selecting one of 1, −1, j, or −j according to an eighth set of CCK codes of No. 5 chip ($C_{5\_8}$) to multiple with the sixth signal register ($X_5$), the product and the fifth operation register ($R_4$) adding up to save in the sixth operation register ($R_5$);

selecting one of 1, −1, j, or −j according to an eighth set of CCK codes of No. 6 chip ($C_{6\_8}$) to multiple with the seventh signal register ($X_6$), the product and the sixth operation register ($R_5$) adding up to save in the seventh operation register ($R_6$);

selecting one of 1, −1, j, or −j according to an eighth set of CCK codes of No. 7 chip ($C_{7\_8}$) to multiple with the eighth signal register($X_7$), the product and the seventh operation register ($R_6$) adding up to save in the eighth operation register ($R_7$).

9. The process of claim 1, further comprising:
sequentially the values saved in the eighth operation registers ($R_7$) to retrieve the maximal one; and
saving the maximal value in the maximal register ($R_8$).

10. An apparatus of sequentially decoding CCK codes, applicable in calculating the correlation between CCK codes, the apparatus comprising:
a series of received signal registers($X_0'$ $X_1'$ $X_2'$ $X_3'$ $X_4'$ $X_5'$ $X_6'$ $X_7$) used to respectively temporarily save the received signals, wherein the received signal registers include a first signal register $X_0$, a second signal register $X_1$, a third signal register $X_2$, a fourth signal register $X_3$, a fifth signal register $X_4$, a sixth signal register $X_5$, a seventh signal register $X_6$ and a eight signal register $X_7$;
a phase selector used to select one numeral from 1, $-1$,j or $-j$ respectively for CCK code of each chip to multiple with the signal register;
a series of adders ($Adder_1$, $Adder_2$, $Adder_3$, $Adder_4$, $Adder_5$, $Adder_6$ and $Adder_7$) used to sequentially complete adding operation;
a series of sequential operation registers ($R_0$, $R_1$, $R_2$, $R_3$, $R_4$, $R_5$, $R_6$, $R_7$) used to save values obtained from the sequential selecting operation of the phase selectors and the sequential adding operation of the adders; and
a comparing device used to select a maximal value from those saved in the operation registers, wherein the comparing device includes a comparator and a maximum register ($R_8$).
wherein the received signal registers include a first signal register $X_0$, a second signal register $X_1$, a third signal register $X_2$, a fourth signal register $X_3$, a fifth signal register $X_4$, a sixth signal register $X_5$, a seventh signal register $X_6$ and a eighth signal register $X_7$;
wherein the sequential operation registers include a first operation register $R_0$, a second operation register $R_1$, a third operation register $R_2$, a fourth operation register $R_3$, a fifth operation register $R_4$, a sixth operation register $R_5$, a seventh operation register $R_6$ and a eighth operation register $R_7$;
wherein the adders include a first adder $Adder_1$, a second $Adder_2$, a third adder $Adder_3$, a fourth $Adder_4$, a fifth $Adder_5$, a sixth $Adder_6$, and a seventh $Adder_7$; and
wherein $X_0$ is subjected to the phase selection and multiplication and then the result is saved in $R_0$; $Adder_1$ adds up $R_0$ and the product of $X_1$ multiplying with a selected phase (1, $-1$, j, $-j$) and saves the obtained sum in $R_1$; Adder adds up $R_1$ and the product of $X_2$ multiplying with a selected phase (1, $-1$, j, $-j$), and saves the obtained sum in $R_2$; $Adder_3$ adds up $R_7$ and the product of $X_3$ multiplying with a selected phase (1, $-1$, j, $-j$) and saves the obtained sum in $R_3$; $Adder_4$ adds up R and the product of $X_4$ multiplying with a selected phase (1, $-1$, j, $-j$), and saves the obtained sum in $R_4$, $Adder_5$ adds up R4 and the product of X5 multiplying with a selected phase (1, $-1$, j, $-j$), and saves the obtained sum in $R_5$; $Adder_6$ adds up $R_5$ and the product of $X_6$ multiplying with a selected phase (1, $-1$, j, $-j$), and saves the obtained sum in $R_6$; $Adder_7$ adds up $R_6$ and the product of $X_7$ multiplying with a selected phase (1, $-1$-j,-j), and saves the obtained sum is saved in $R_7$.

11. The apparatus of claim 10, wherein the comparator is a 2-to-1 comparator.

12. A system of sequentially decoding CCK codes, which is applied to calculate CCK code correlation in a wireless network, the system comprising:
a series of received signal registers ($X_0$, $X_1$, $X_2$, $X_3$, $X_4$, $X_5$, $X_6$, $X_7$) to temporarily save received signals;
a first sequentially decoding module for sequentially decoding CCK codes according to the received signals;
a second sequentially decoding module used to for sequentially decoding CCK codes according to the received signals;
a third sequentially decoding module used to for sequentially decoding CCK codes according to the received signals;
a fourth sequentially decoding module used to for sequentially decoding CCK codes according to the received signals;
a fifth sequentially decoding module used to for sequentially decoding CCK codes according to the received signals;
a sixth sequentially decoding module used to for sequentially decoding CCK codes according to the received signals;
a seventh sequentially decoding module used to for sequentially decoding CCK codes according to the received signals; and
an eighth sequentially decoding module used to for sequentially decoding CCK codes according to the received signals
wherein each sequentially decoding module comprises:
a phase selector used to select one of 1, $-1$, j or $-j$ according to CCK code of each chip to multiple with the corresponding value of the register;
a series of adders ($Adder_1$, $Adder_2$, $Adder_3$, $Adder_4$, $Adder_5$, $Adder_6$ and $Adder_7$) used to complete the adding operation in sequence;
a series of sequential operation registers ($R_0$, $R_1$, $R_2$, $R_3$, $R_4$, $R_5$, $R_6$, and $R_7$) is used to save values obtained from the sequential selecting operation of the phase selectors and the sequential adding operation of the adders;
a comparing device used to select a maximal value among those saved in the operation registers, the comparing device including a comparator and a maximum register ($R_8$);
wherein the received signal registers include a first signal register $X_0$, a second signal register $X_1$, a third signal register $X_2$, a fourth signal register $X_3$, a fifth signal register $X_4$, a sixth signal register $X_4$, a seventh signal register $X_6$ and a eighth signal register $X_7$,
wherein the sequential operation registers include a first operation register R, a second operation register $R_1$, a third operation register $R_2$, a fourt operation register $R_3$, a fifth operation register $R_4$, a sixth operation register $R_5$, a seventh operation register $R_6$ and a eighth operation register $R_7$;
wherein the adders include a first adder $Adder_1$, a second $Adder_2$, a third adder $Adder_3$, a fourth $Adder_4$, a fifth $Adder_5$, a sixth $Adder_6$ and a seventh $Adder_7$;
wherein $X_0$ is subjected to the phase selection and multiplication and then the result is saved in $R_0$; $Adder_1$ adds up $R_0$ and the product of $X_1$ multiplying with a selected phase (1, $-1$, j, $-j$) and saves the obtained sum in $R_1$; $Adder_2$ adds up $R_1$ and the product of $X_2$ multiplying with a selected phase (1, $-1$, j, $-j$), and saves the obtained sum in $R_2$; $Adder_3$ adds up $R_2$ and the product of $X_3$ multiplying with a selected phase (1, $-1$, j, $-j$), and saves the obtained sum in $R_3$; $Adder_4$ adds up $R_3$ and the product of $X_4$ multiplying with a selected phase $(1, -1, j, -j)$, and saves the obtained sum in R4; $Adder_5$ adds up $R_4$ and the product of $X_5$ multiplying with a selected phase $(1, -1, j, -j)$, and saves the obtained sum in $R_5$; $Adder_6$ adds up $R_5$ and the product of $X_6$ multiplying with a selected phase $(1, -1, j -j)$, and saves the obtained sum in $R_6$; $Adder_7$ adds up $R_6$ and the product of $X_7$ multiplying with a selected phase $(1, -1, j, -j)$, and saves the obtained sum is saved $R_7$.

13. The apparatus of claim 12, wherein the comparator is a 2-to-1 comparator.

* * * * *